(12) United States Patent
Tanaka (10) Patent No.: US 9,100,559 B2
(45) Date of Patent: Aug. 4, 2015

(54) IMAGE PROCESSING APPARATUS, IMAGE PICKUP APPARATUS, IMAGE PROCESSING METHOD, AND IMAGE PROCESSING PROGRAM USING COMPOUND KERNEL

(71) Applicant: CANON KABUSHIKI KAISHA, Tokyo (JP)

(72) Inventor: Shin Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/886,326

(22) Filed: May 3, 2013

(65) Prior Publication Data

US 2013/0308007 A1  Nov. 21, 2013

(30) Foreign Application Priority Data

May 18, 2012 (JP) ................................. 2012-114737

(51) Int. Cl.
*H04N 5/225* (2006.01)
*G06T 17/00* (2006.01)
*H04N 5/357* (2011.01)

(52) U.S. Cl.
CPC ............. *H04N 5/225* (2013.01); *H04N 5/3572* (2013.01)

(58) Field of Classification Search
CPC ....................................................... H04N 5/272
USPC .................................................. 348/252, 239
See application file for complete search history.

(56) References Cited

U.S. PATENT DOCUMENTS 6,900,841 B1   5/2005 Mihara
2008/0259154 A1* 10/2008 Garrison et al. ........... 348/14.01

FOREIGN PATENT DOCUMENTS

JP   2000-207549 A   7/2000
JP   2011-211663 A   10/2011

OTHER PUBLICATIONS

T. Mikio et al., "Handbook of Image Analysis", University of Tokyo Press, pp. 77-78 (2004.

* cited by examiner

*Primary Examiner* — Joel Fosselman
(74) *Attorney, Agent, or Firm* — Fitzpatrick, Cella, Harper & Scinto (57) ABSTRACT

An image processing apparatus that blurs a picked-up image based on distance information on a subject, comprises a restoration kernel acquisition section that acquires a restoration kernel as a kernel for eliminating degradation of an image; a blur kernel acquisition section that acquires a blur kernel as a kernel for blurring the image; a compound kernel acquisition section that acquires a compound kernel obtained by merging the restoration kernel with the blur kernel; and an image processing section that eliminates the degradation of the picked-up image and blurs the picked-up image by using the compound kernel.

12 Claims, 7 Drawing Sheets

IMAGE PROCESSING APPARATUS, IMAGE PICKUP APPARATUS, IMAGE PROCESSING METHOD, AND IMAGE PROCESSING PROGRAM USING COMPOUND KERNEL

BACKGROUND OF THE INVENTION

1. Field of the Invention

The present invention relates to digital image processing, and particularly relates to an image processing technology that performs blurring on an image.

2. Description of the Related Art

In recent years, there is proposed a compact digital camera capable of obtaining an excellent blur by increasing the size of an image sensor. However, when the size of the image sensor is increased, the size of an image-forming optical system is also increased so that it becomes difficult to reduce the size of the camera. To cope with this, Japanese Patent Application Laid-open No. 2000-207549 discloses a camera in which blurring is performed by picking up an image that is nearly in deep focus (a state where all areas are in focus), acquiring information on the distance to a subject, and performing predetermined image processing on the picked-up image.

However, even when the deep-focus image is to be picked up, in reality, it is not possible to obtain an image which is perfectly focused in all areas due to influences of diffraction caused by an aperture and image plane aberration, and a difference in object distance. Particularly in a compact digital camera, the influence of the diffraction or the aberration tends to be increased. To cope with this, Japanese Patent Application Laid-open No. 2011-211663 discloses an invention in which an image degraded by the influence of the diffraction or aberration is restored by digital processing.

In a case where blurring processing in which the focus position of a picked-up image is changed is performed, when the picked-up image is not a strictly deep-focus image, there arises a problem that the image quality after the blurring is degraded, i.e., apart that should be in focus is blurred. In addition, there is a problem that, even in the part in focus, the image is degraded by the influence of the diffraction or aberration and a blurred image having high image quality cannot be obtained.

SUMMARY OF THE INVENTION

In order to solve the above problems, an object of the present invention is to provide an image processing apparatus, an image pickup apparatus, an image processing method, and an image processing program capable of generating a blurred image having high quality without the influence of the diffraction or aberration.

The present invention in its one aspect provides an image processing apparatus that blurs a picked-up image based on distance information on a subject, comprising: a restoration kernel acquisition section that acquires a restoration kernel as a kernel for eliminating degradation of an image; a blur kernel acquisition section that acquires a blur kernel as a kernel for blurring the image; a compound kernel acquisition section that acquires a compound kernel obtained by merging the restoration kernel with the blur kernel; and an image processing section that eliminates the degradation of the picked-up image and blurs the picked-up image by using the compound kernel.

The present invention in its another aspect provides an image processing apparatus that blurs a picked-up image based on distance information on a subject, comprising: a restoration kernel acquisition section that acquires a restoration kernel as a kernel for eliminating degradation of an image; a blur kernel acquisition section that acquires a blur kernel as a kernel for blurring the image; and an image processing section that eliminates the degradation of the picked-up image and blurs the picked-up image by using the restoration kernel and the blur kernel, wherein the restoration kernel acquisition section acquires the restoration kernel associated with a distance and an angle of view corresponding to an area to be processed on the picked-up image, and the blur kernel acquisition section acquires the blur kernel associated with the distance and the angle of view corresponding to the area to be processed on the picked-up image.

The present invention in its another aspect provides a non-transitory recording medium recording thereon an image processing program for causing an image processing apparatus that blurs a picked-up image based on distance information on a subject to execute the steps of: acquiring a restoration kernel as a kernel for eliminating degradation of an image; acquiring a blur kernel as a kernel for blurring the image; acquiring a compound kernel obtained by merging the restoration kernel with the blur kernel; and eliminating the degradation of the picked-up image and blurring the picked-up image by using the compound kernel.

The present invention in its another aspect provides a non-transitory recording medium recording thereon an image processing program for causing an image processing apparatus that blurs a picked-up image based on distance information on a subject to execute the steps of: acquiring a restoration kernel as a kernel for eliminating degradation of an image; acquiring a blur kernel as a kernel for blurring the image; and eliminating the degradation of the picked-up image and blurring the picked-up image by using the restoration kernel and the blur kernel, wherein the restoration kernel associated with a distance and an angle of view corresponding to an area to be processed on the picked-up image is acquired in the step of acquiring a restoration kernel, and the blur kernel associated with the distance and the angle of view corresponding to the area to be processed on the picked-up image is acquired in the step of acquiring a blur kernel.

According to the present invention, it is possible to provide the image processing apparatus, the image pickup apparatus, the image processing method, and the image processing program capable of generating the blurred image having high quality without the influence of the diffraction or aberration.

Further features of the present invention will become apparent from the following description of exemplary embodiments with reference to the attached drawings.

DESCRIPTION OF THE PREFERRED EMBODIMENTS (First Embodiment)

Hereinbelow, a description will be given of an image processing apparatus as one aspect of the present invention with reference to the drawings. Like reference numeral in each drawing denote like means. Note that the scope of the present invention is not intended to be limited to examples shown in the description of the embodiments.

<System Configuration>

Figure 1:
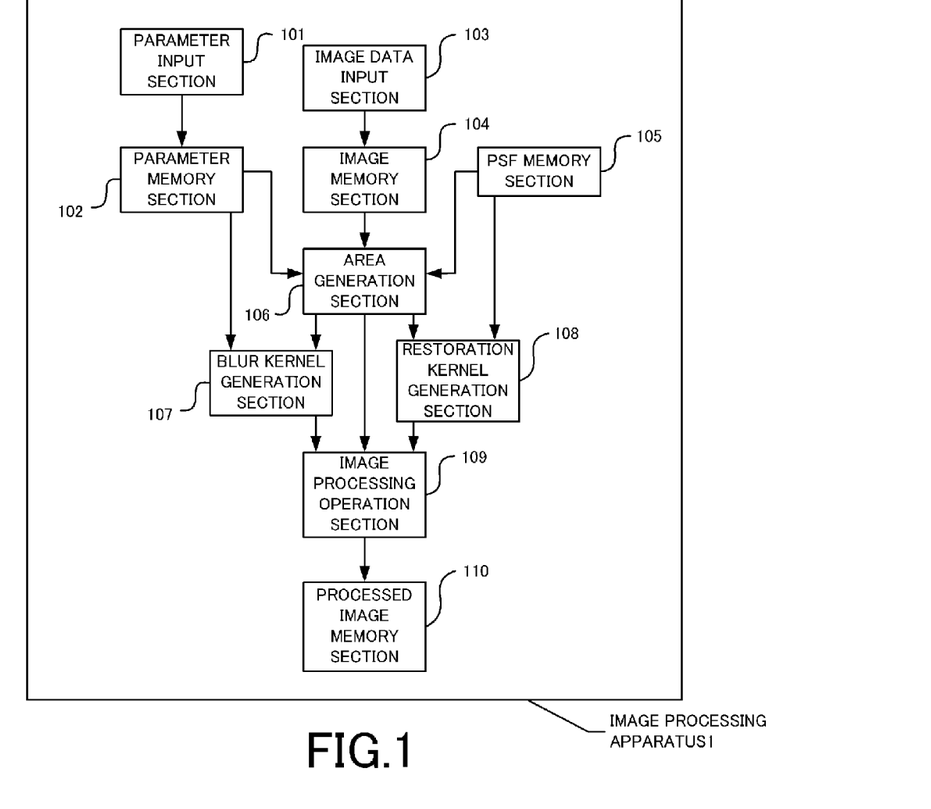
FIG. 1 is a block diagram showing the configuration of an image processing apparatus according to a first embodiment.

FIG. 1 is a system configuration view of an image processing apparatus according to a first embodiment.

An image processing apparatus 1 has a parameter input section 101, a parameter memory section 102, an image data input section 103, an image memory section 104, a PSF memory section 105, and an area generation section 106. In addition, the image processing apparatus 1 also has a blur kernel generation section 107, a restoration kernel generation section 108, an image processing operation section 109, and a processed image memory section 110.

The image processing apparatus according to the present embodiment may be implemented by using dedicated circuits or may be implemented by a computer. When the image processing apparatus is implemented by the computer, a program stored in an auxiliary storage device is loaded into a main storage device and executed by a CPU, and the individual means shown in FIG. 1 thereby function (the CPU, the auxiliary storage device, and the main storage device are not shown in the drawing).

The parameter input section 101 is an input section for inputting parameters related to image pickup conditions such as a focus position and an exposure, a threshold of an image degradation amount used in area generation processing described later, and parameters required to determine the size and shape of a blur to the image processing apparatus. The parameter memory section 102 is a memory for storing the parameters inputted from the parameter input section 101.

The image data input section 103 is an input section for inputting data on an image picked up by image pickup means that is not shown, i.e., data in which the picked-up image is represented by two-dimensional brightness values, and distance information corresponding to the image data to the image processing apparatus. A detailed description of the distance information will be given later. The image memory section 104 is a memory for storing the image data inputted to the image data input section 103.

The PSF memory section 105 is a memory for storing a PSF for image restoration, or data that can replace the PSF. The point spread function (PSF) mentioned herein is a function representing the spread of rays when an ideal point image passes through a target optical system. In the present embodiment, the PSF for restoring an image degraded by aberration or diffraction by means of deconvolution processing is stored. The distance to a subject and the angle of view have various conditions, and hence the PSF memory section 105 stores a plurality of the PSFs corresponding to the individual conditions.

The area generation section 106 is means for generating a processing area when image restoration and blurring processing are performed based on the information stored in the parameter memory section 102, the image memory section 104, and the PSF memory section 105. More specifically, the area generation section 106 determines an image area (an extended area in the present invention) of the picked-up image where the processing can be performed by using an identical blur kernel and an identical restoration kernel. The area generation section 106 is an image area extension section in the present invention.

The blur kernel generation section 107 is means for generating the blur kernel corresponding to the image area determined by the area generation section 106. The blur kernel mentioned herein is a kernel for performing filter processing for blurring the image. The blur kernel generation section 107 is capable of generating the blur kernel associated with conditions such as the object distance, the angle of view, an F-number, a focal length, and parameters related to the blur. The blur kernel generation section 107 is a blur kernel acquisition section in the present invention. The phrase "object distance" used in this description indicates a distance to the subject.

The restoration kernel generation section 108 is means for determining the PSF corresponding to the image area generated by the area generation section 106 based on the plurality of the PSFs stored in the PSF memory section 105 and generating the restoration kernel as the kernel for performing image restoration processing. The restoration kernel generation section 108 is a restoration kernel acquisition section in the present invention.

The image processing operation section 109 is means for performing operation processing that gives effects of the image restoration and the blurring to the image stored in the image memory section 104 based on the information obtained from the area generation section 106, the blur kernel generation section 107, and the restoration kernel generation section 108.

The processed image memory section 110 is a memory for storing the blurred image generated in the image processing operation section 109.

<Processing Flowchart>

Figure 2:
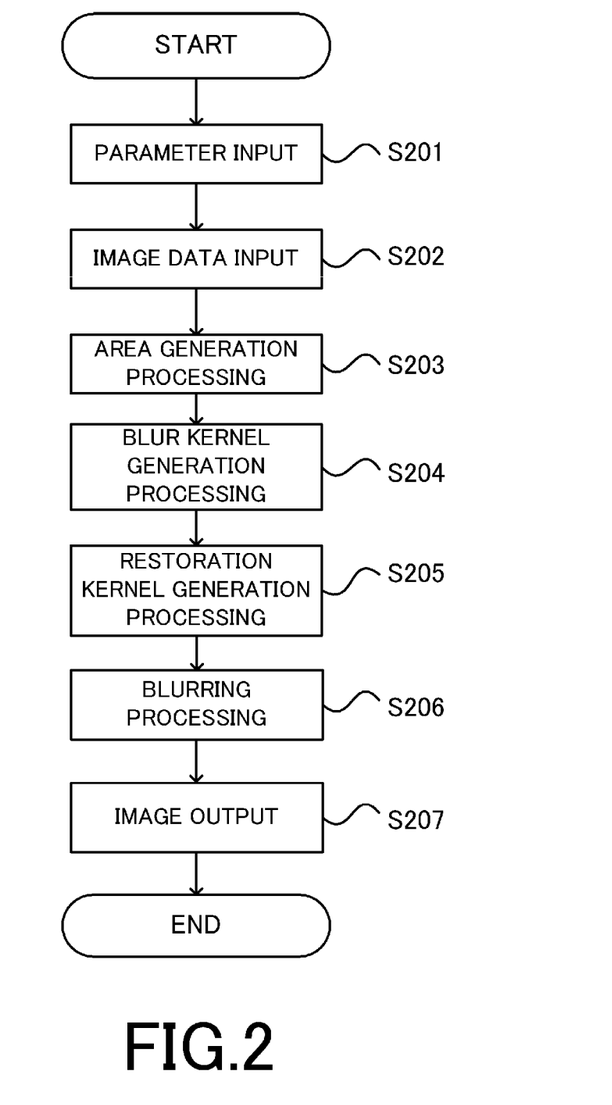
FIG. 2 is a flowchart showing the operation of the image processing apparatus according to the first embodiment.

Next, a detailed description will be given of the operation of the image processing apparatus 1 with reference to a processing flowchart. FIG. 2 is a flowchart showing the processing performed by the image processing apparatus 1.

In Step S201, the parameter input section 101 acquires the parameters related to the image pickup conditions, the threshold of the image degradation amount used in the area generation processing described later, and the parameters required for the blurring. The parameters may be inputted by a user or may also be acquired from the image pickup means. Alternatively, pre-stored parameters may also be acquired. The inputted parameters are stored in the parameter memory section 102. By using these parameters, the area generation processing, blur kernel generation processing, and restoration kernel generation processing described later are executed.

In Step S202, the image data input section 103 acquires the image data picked up by the image pickup means and the distance information corresponding to the image data or data convertible to the distance information, and causes the image memory section 104 to store them. The data convertible to the distance information mentioned herein includes direct distance information such as a relative distance from the eye point position of inputted image data and a position in global coordinates or the like, and parallax information generated by using image information from a plurality of the image pickup means.

In addition, the data convertible to the distance information may also be data for acquiring the distance by using the technology of computational photography as an image-forming method using digital processing.

For example, in a technology called depth from defocus (DFD), it is possible to determine the object distance by acquiring a focus image and a defocus image and analyzing a blur amount. In addition, the data convertible to the distance information may be any data as long as the data is for acquiring the object distance. For example, a defocus amount calculated from the distance information and the focus position as one of the parameters related to the image pickup conditions inputted in Step S201 may be used as the input data.

In Step S203, when the image restoration processing and the image blurring processing are performed, processing for generating a new area serving as a shift-invariant area is performed. The shift-invariant area mentioned herein denotes an area to which the identical kernel can be applied in the image processing operation (the image restoration processing and the image blurring processing) described later.

In other words, the shift-invariant area is an area where the degradation of the image quality falls within a permissible range even when the processing is performed by using the identical kernel. In a case where the present step is not executed, it is necessary to perform the image processing operation for each area to be processed (e.g., for each pixel held by the image). However, by executing the present step, it is possible to reduce the number of areas to be processed while minimizing the degradation of the image quality.

Figure 3:
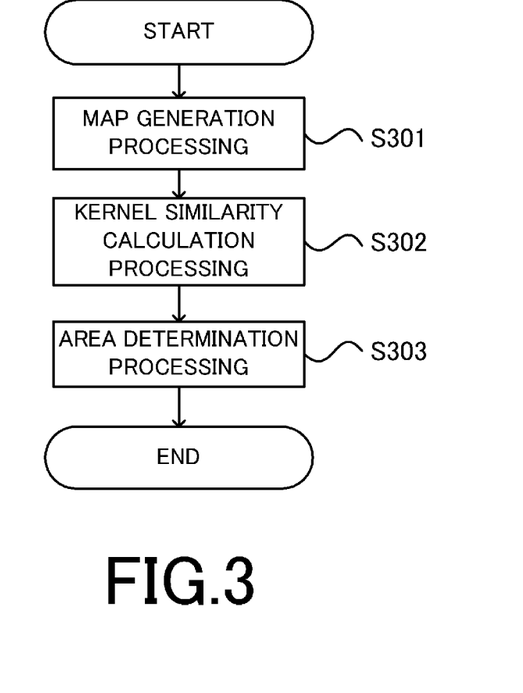
FIG. 3 is a flowchart showing the operation of area generation processing in the first embodiment.

Herein, a detailed description will be given of the content of the area generation processing performed by the area generation section 106 in Step S203. FIG. 3 is a flowchart showing the processing in Step S203 in detail.

First, in Step S301, the generation of a map is performed. The map is the data group of a plurality of the restoration kernels and the blur kernels assigned to different areas on the image.

Figure 4:
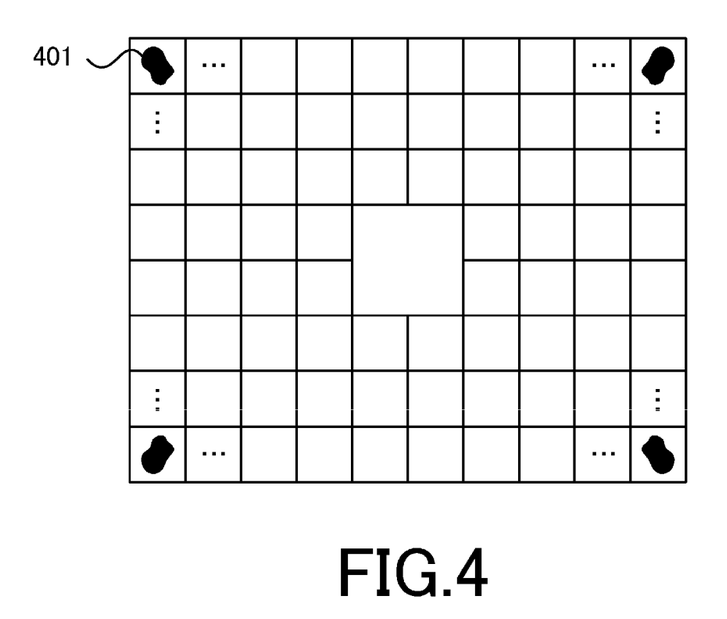
FIG. 4 is a view illustrating a map generated in the first embodiment.

FIG. 4 is a view two-dimensionally showing an example of the map. The restoration kernel and the blur kernel to be used are assigned to each of the areas to be processed preset on the picked-up image. The reference numeral 401 denotes the kernel assigned to each area to be processed. The area to be processed may be an area including only one pixel and may also be an area having an arbitrary shape that includes a plurality of pixels. This map is the map before the area generation section 106 performs the area generation processing.

The restoration kernel and the blur kernel assigned to each area to be processed differ depending on the actual image pickup conditions and optical configuration, i.e., the object distance and the angle of view. The kernel generated by the operation every time the processing is performed may be acquired or the kernel that is pre-calculated and stored may also be acquired.

It is possible to generate the blur kernel by using a plurality of the PSFs corresponding to the blurring conditions (the object distance, the angle of view, the intensity of the blur, and the like). The PSF used in the generation of the blur kernel may be generated by the operation from the blurring conditions on an as needed basis, or the appropriate one may also be selected from the PSFs that are pre-calculated and stored. With this arrangement, it is possible to impart the blur in line with the actual optical system.

The blur kernel may not be necessarily generated by the PSF in line with the actual optical system. For example, a shared blur kernel is stored and an objective blur kernel may be acquired by converting the shared blur kernel by using the object distance and the angle of view as the parameters. Thus, the blur kernel to be used may be determined in any manner in a desired form.

Figure 5:
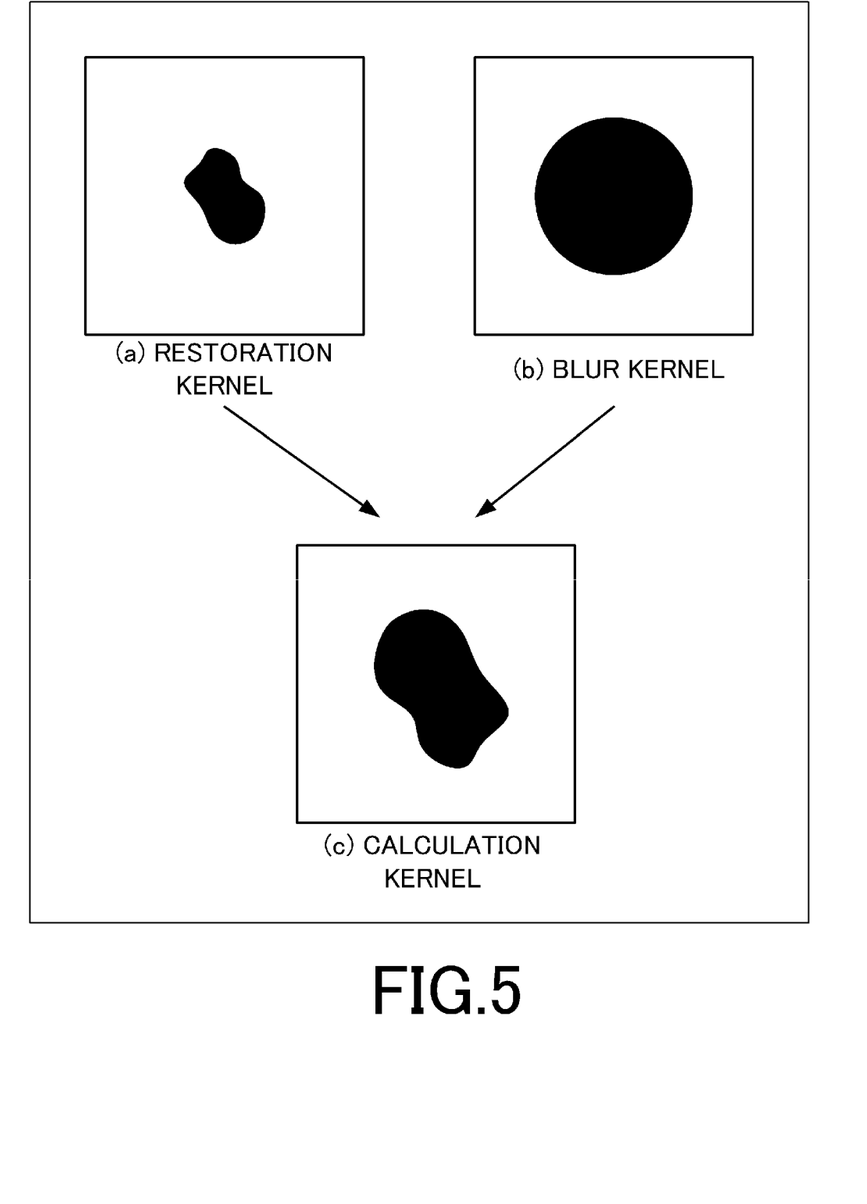
FIG. 5 is a view illustrating composition of a calculated kernel in the first embodiment.

A kernel obtained by deconvoluting the blur kernel using the restoration kernel and merging the blur kernel with the restoration kernel may be assigned to each area to be processed (hereinafter this kernel is referred to as a calculated kernel). FIG. 5 is a view showing the calculated kernel obtained by deconvoluting the blur kernel using the restoration kernel in the form of a two-dimensional figure. In other words, the figure shown in FIG. 5 represents an area formed of a filter matrix corresponding to the calculated kernel. Note that the calculated kernel is a compound kernel in the present invention.

The calculated kernel assigned to the area to be processed also differs depending on the distance and the angle of view. The calculated kernel generated on an as needed basis may be acquired or a plurality of the calculated kernels that are pre-generated and stored may also be acquired. When the calculated kernel is generated, the image processing operation section 109 functions as a compound kernel acquisition section in the present invention. Hereinafter, the blur kernel, the restoration kernel, or the calculated kernel is simply referred to as the kernel.

Next, in Step S302, the calculation of a kernel similarity is performed for each of the areas to be processed. The kernel similarity is a parameter indicative of the similarity of the kernel assigned to the area to be processed. When a new area is generated in Step S303, the degradation amount of the image quality is determined by using the similarity.

A first example of the kernel similarity will be given. The first example is an example in which the similarity is calculated based on the size and shape of the kernel. The similarity of the size of the kernel can be determined by the area of the kernel, the distance from the center point thereof, and the radius thereof. For example, the virtual center of gravity of each of the kernels is calculated, the average distance from the center of gravity as the center point to the edge is calculated, and the similarity of the kernels may be determined by using the average distance. In addition, matching of the shapes of the kernels is performed and a parameter indicative of the similarity of the shapes may be calculated.

Next, a second example of the kernel similarity will be given. The second example is an example in which the frequency characteristic of the kernel is used. For example, the kernel is subjected to Fourier transformation and the similarity is calculated by using an modulation transfer function (MTF). The MTF represents fidelity in reproduction of the contrast of the subject on an image plane as the spatial frequency characteristic (hereinafter the MTF means the MTF in the image pickup system). In the second example, a kernel similarity I is calculated by Formula 1:

[Math 1]

$$I = \int_{\mu_1}^{\mu_2} MTF(\mu) d\mu. \tag{1}$$

Herein, $\mu$ represents the spatial frequency, $\mu_1$ and $\mu_2$ are constants for setting the upper and lower limits of the spatial frequency, and I is obtained by integrating the MTF with the spatial frequency. In the calculation, the image data may be subjected to Fourier transformation and the frequency characteristic of the image data may also be used.

The kernel similarity I described above can be used as the reference when the similarities of a plurality of the kernels associated with various distances and angles of view are compared with each other. Note that the first and second examples may be used in combination. For example, the calculated similarity may be weighted and added.

In Step S303, a new area is determined by using the kernel similarity I calculated in Step S302. The new area determined in this step is an area obtained by merging the areas to be processed having similar kernel similarities I.

More specifically, a threshold T of the image quality degradation amount is prepared, and a plurality of new areas each in which the change amount of I is not more than T are determined. The area may be determined in any manner as long as the change amount of the kernel similarity is not more than T. The newly determined area serve as an area in which the image processing is performed by using the identical kernel. By limiting the change of the kernel similarity in the area to a specific value, it is possible to limit the degradation of the image quality caused by the blurring processing to a specific amount. Note that the threshold T of the image quality degradation amount may be included in the parameters inputted in Step S202, and a value stored therein may also be used.

Figure 6A:
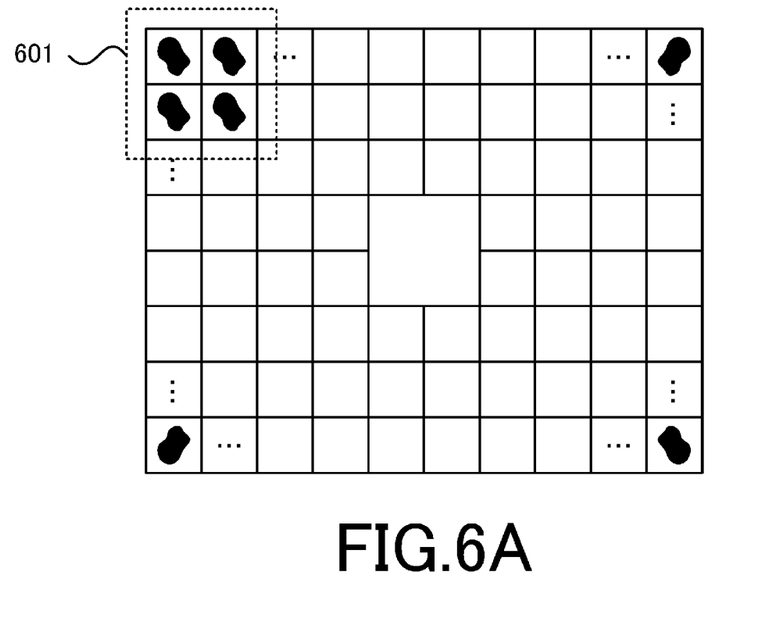
FIGS. 6A and 6B are views illustrating the area generation processing in the first embodiment.

A description will be given by using a simple specific example. FIG. 6 show the result of the processing in Step S203. FIG. 6A shows the map before the processing in Step S203 is performed. Different kernels are assigned to the individual square areas shown in FIG. 6A.

Figure 6B:
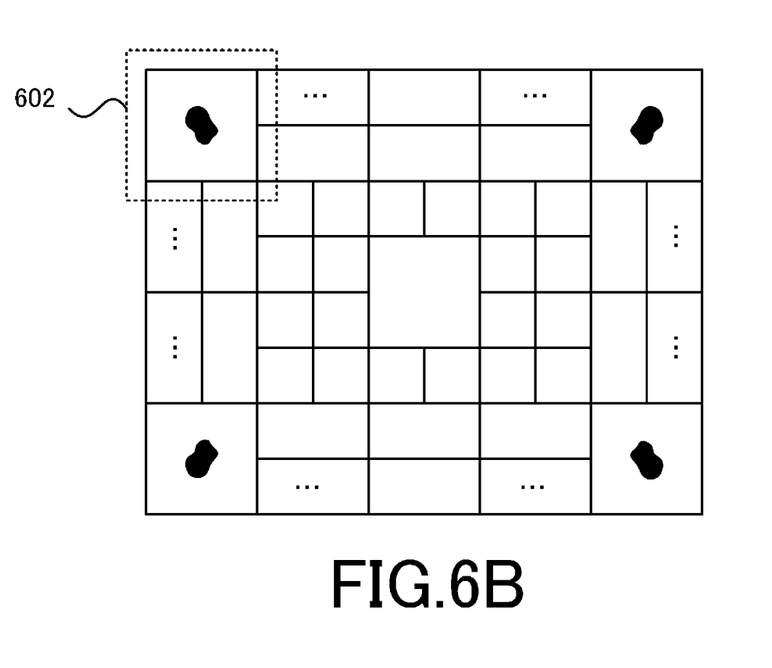

FIG. 6B shows the map after the processing in Step S203 is performed. For example, in a case where it is determined that, with regard to the kernels included in an area 601, the change amount of the kernel similarity I is not more than the threshold, an area 602 as a new area is generated. The area 602 serves as the area where the image processing is performed by using the identical kernel. By performing the processing in Step S203, it is possible to reduce the number of kernels used in the image processing while limiting the degradation of the image quality to the specific amount.

In Step S204, the blur kernel corresponding to the new area generated in Step S203 is generated. Specifically, similarly to Step S301, the blur kernel associated with the image pickup conditions, the object distance and the angle of view according to the optical configuration, and the parameter is generated for each area. In a case where there is a blur kernel that is pre-calculated and stored, the blur kernel may be used.

In addition, with regard to the PSF for generating the blur kernel, the PSF that differs depending on the parameter may be pre-stored. The correspondence to the area, i.e., only elements that determines the PSF such as the distance and the angle of view are stored and the blur kernel may be generated by generating the PSF on an as-needed basis. By the processing of the present step, the blur kernel corresponding to the newly generated area is determined.

In Step S205, as the blur kernel generated in Step S204, the restoration kernel generation section 108 generates the restoration kernel corresponding to the new area generated in Step S203. Specifically, similarly to Step S301, the restoration kernel generation section 108 generates the restoration kernel determined by the image pickup conditions and the optical configuration, or its replacement for each area. In a case where a restoration kernel is pre-calculated and stored, the restoration kernel may be used.

In the present embodiment, although the restoration kernel is generated by using the pre-stored PSF, the correspondence to the area, i.e., only elements that determines the PSF such as the distance and the angle of view are stored and the restoration kernel may be generated by generating the PSF on an as-needed basis. By the processing of the present step, the restoration kernel corresponding to the newly generated area is determined.

In Step S206, the image processing operation section 109 performs the image processing by using the image data stored in the image memory 104, the image area newly generated in Step S203, the blur kernel generated in Step S204, and the restoration kernel generated in Step S205. The image processing performed in the present step is processing that performs the image restoration and the blurring of the target image.

Specifically, a convolution calculation of the image data and the blur kernel is performed, and a deconvolution calculation of the restoration kernel is performed. Although there are various methods of the deconvolution calculation, the simplest example of the method will be described herein. First, the deconvolution calculation is defined as Formula 2. Note that P represents the image data in a given image area, B represents the corresponding blur kernel, and S represents the corresponding restoration kernel:

[Math 2]

$$(P \otimes B)(x,y) = \iint P(x',y') B(x-x', y-y') dx' dy'. \quad (2)$$

This is the calculation for one pixel in the image area. That is, the blurring processing of the image can be performed by repeatedly performing the calculation on all pixels in the image area. Herein, since the processing can be performed by using the identical kernel in the area newly generated in Step S204, the calculation can be performed by using a convolution theorem as in Formula 3:

[Math 3]

$$(P \otimes B)(x,y) = IFT\{FT[P(x,y)] \cdot FT[B(x,y)]\}. \quad (3)$$

Herein, FT represents two-dimensional Fourier transformation, and IFT represents two-dimensional inverse Fourier transformation. In a case where the image having been subjected to the image restoration and the blurring is generated, the calculation may be performed according to Formula 4:

[Math 4]

$$\left(P \otimes B \otimes \frac{1}{S}\right)(x,y) = IFT\{FT[P(x,y)] \cdot FT[B(x,y)] / FT[S(x,y)]\}. \quad (4)$$

By performing the above calculation on all of the image areas generated in the area generation section 106, it is possible to give the effects of the image restoration and the blurring to the inputted image data. Note that, in order to use other methods of the deconvolution calculation, the image data to which the blurring effect by the convolution calculation of the image data and the blur kernel is already given may be used. In addition, as described above, the convolution calculation of the image data may be performed by using the calculated kernel.

Subsequently, the image output is performed in Step S207, and the image to which the effects of the image restoration and the blurring are given is stored in the processed image memory section 110.

Thus, according to the image processing apparatus according to the present embodiment, even when the inputted image is not the image that is perfectly focused, it is possible to obtain the blurred image having high image quality. In addition, it is possible to calculate the shift-invariant area in an arbitrary image. With this, it is possible to reduce the number kernels to be used for the image restoration while maintaining necessary and sufficient image quality, and apply the convolution theorem. As a result, it is possible to provide the blurring effect having high image quality and significantly reduce the calculation amount.

(Second Embodiment)

Figure 7:
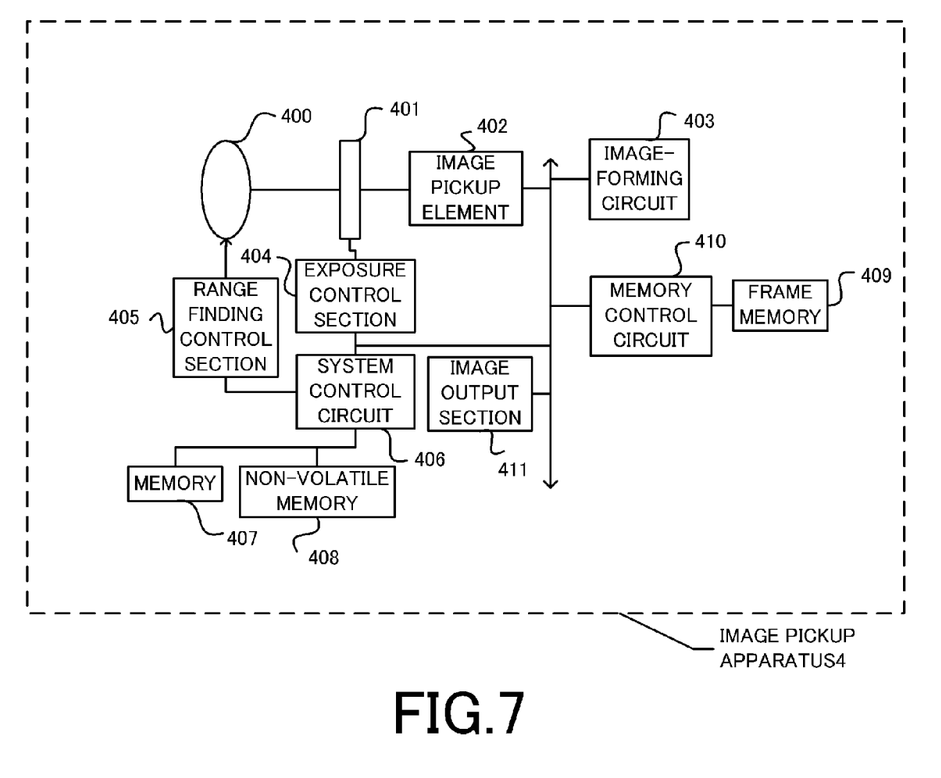
FIG. 7 is a block diagram showing the configuration of an image pickup apparatus according to a second embodiment.

An image pickup apparatus according to a second embodiment is an image pickup apparatus including the image processing apparatus 1 according to the first embodiment. FIG. 7 shows the configuration of the image pickup apparatus according to the present embodiment. An image pickup apparatus 4 is typically a digital still camera, a digital video camera, or the like.

In FIG. 7, the reference numeral 400 denotes an image pickup lens that guides a subject light to an image pickup element 402. The reference numeral 401 denotes an exposure control element including a diaphragm and a shutter. The subject light having entered via the image pickup lens 400 enters into the image pickup element 402 via the exposure control element 401. The image pickup element 402 is an image pickup element that converts the object light to an electric signal and outputs the electric signal, and is constituted by an image sensor such as a CCD or a CMOS.

An image-forming circuit 403 is a circuit for digitizing and visualizing an analog output signal from the image pickup element 402, and outputs a digital image. The image-forming circuit 403 is constituted by an analog/digital conversion circuit, an auto gain control circuit, an auto white balance circuit, a pixel interpolation processing circuit, and a color conversion processing circuit that are not shown, and the image processing apparatus 1 according to the first embodiment.

An exposure control section 404 is means for controlling the exposure control element 401. A range finding control section 405 is means for controlling focusing of the image pickup lens 400. The exposure control section 404 and the range finding control section 405 are controlled by using, e.g., a through-the-lens method (TTL) method (a method in which exposure and focusing are controlled by measuring light actually passing through an image pickup lens).

A system control circuit 406 is a circuit that controls the operation of the entire image pickup apparatus 4. A memory 407 is a memory that uses a flash ROM or the like that records data for the operation control and processing programs in the system control circuit 406. A non-volatile memory 408 is a non-volatile memory such as an EEPROM for storing information items such as various adjustment values and the like that can be electrically erased or recorded.

A frame memory 409 is a memory that stores images generated in the image-forming circuit 403 that are equivalent to several frames. A memory control circuit 410 is a circuit that controls an image signal inputted to or outputted from the frame memory 409. An image output section 411 is means for displaying the image generated in the image-forming circuit 403 on an image output apparatus that is not shown.

In the second embodiment, the image obtained by the image pickup element 402 is inputted to the image-forming circuit 403 including the image processing apparatus according to the first embodiment. That is, the image data acquired by the image pickup element 402, i.e., data representing the two-dimensional brightness value is the input to the image data input section 103 in the first embodiment. It is possible to acquire the distance information inputted to the image data input section 103 by processing by the known DFD method executed by the image-forming circuit 403. It is possible to acquire the parameters related to the image pickup conditions inputted to the parameter input section 101 from the system control circuit 406.

The contents of the image restoration and the blurring processing performed by the image-forming circuit 403 are the same as those performed by the image processing apparatus 1 according to the first embodiment.

According to the second embodiment, it is possible to provide the image pickup apparatus capable of performing the blurring having high quality on the picked-up image by using the image processing apparatus according to the first embodiment.

(Third Embodiment)

A third embodiment is an embodiment in which the kernel similarity I in the first embodiment is determined based on a visual spatial frequency characteristic in addition to the frequency characteristic of the kernel.

The present embodiment is different from the first embodiment only in the calculation method of the kernel similarity in Steps S301 and S302. The configuration and the processing method are otherwise the same as those in the first embodiment.

In the present embodiment, the kernel similarity is calculated by using the visual spatial frequency characteristic in addition to the MTF of each of the blur kernel and the restoration kernel. As an example, a value called a cascaded modulation transfer acutance (CMTA) is used. The CMTA is described in detail in "TAKAGI Mikio, SHIMODA Haruhisa, "Handbook of Image Analysis (Revised Edition)", University of Tokyo Press, p. 77-78, 2004".

It is possible to determine the shift-invariant area by using the method described in the first embodiment. However, it is known that human sight has a distinct spatial frequency characteristic, and a spatial frequency having a large reaction to the change of the spatial frequency and a spatial frequency having a small reaction to the change of the spatial frequency are present. Accordingly, by weighting the MTF of the kernel by using the visual spatial frequency characteristic, it becomes possible to determine the kernel similarity more accurately in the area where a human being cannot perceive the change.

The MTF for the visual spatial frequency is known as a contrast sensitivity function (CSF). The CSF is obtained by modeling of a visual contrast sensitivity in consideration of characteristics of a low-pass filter in the image-forming system of an eyeball and characteristics of a band-pass filter in the signal processing system from a retina to a brain. An example of the CSF is represented by Formula 5:

[Math 5]

$$\mathrm{CSF}(f) = a \cdot f \exp(-b \cdot f). \tag{5}$$

Herein, f is the spatial frequency, and is represented by a unit (cycle/deg) representing the number of times of viewing a contrast stripe per degree of human visual angle. Although a is often set to 75 and b is often set to 0.2, the values are not fixed and are changed depending on various conditions related to an evaluation environment.

A factor obtained by normalizing the integration value of the product of the CSF and the MTF of each of the blur kernel and the restoration kernel in a given spatial frequency range is called a subjective quality factor (SQF). Herein, the MTF of the blur kernel in the present embodiment is assumed to be an MTFb, while the MTF of the restoration kernel in the present embodiment is assumed to bean MTFs. The SQF is obtained by (Formula 6) dividing the integration value (integrated value) of the product of the spatial frequency characteristic of the kernel and the visual spatial frequency by the integration value (integrated value) of the visual spatial frequency. Note that f represents the spatial frequency and $f_1$ and $f_2$ represent constants for setting the upper and lower limits of the spatial frequency:

[Math 6]

$$SQF = \frac{\int_{f_1}^{f_2} MTF_b(f)/MTF_s(f) \cdot CSF(f) df}{\int_{f_1}^{f_2} CSF(f) df}. \tag{6}$$

The CMTA is obtained by making the SQF linear to the sense of a human being by using Weber-Fechner's law and normalizing the SQF to 100. Weber-Fechner's law mentioned herein is a law that the sense of a human being is proportional to a logarithm of a stimulation, and the CMTA can be formulated as Formula 7. By using the CMTA as the kernel similarity I, it is possible to determine the shift-invariant area in which the visual spatial frequency characteristic is reflected:

[Math 7]

$$\text{CMTA} = 100 + 66 \log_{10}(\text{SQF}). \tag{7}$$

Thus, according to the image processing apparatus according to the present embodiment, by using the evaluation value using the CMTA, it is possible to identify the range of the image quality change that a human being cannot perceive and determine the shift-invariant area more accurately. That is, it is possible to reduce the number of kernels for the image restoration while maintaining the necessary and sufficient image quality for the human sight, and apply the convolution theorem. As a result, as compared with the first embodiment, it is possible to obtain the blurring effect having high image quality while achieving a reduction in calculation amount.

The description of the embodiments is illustrative for the description of the present invention, and the present invention can be implemented by appropriately changing or combining the embodiments without departing from the gist of the invention. The present invention can be implemented as an image processing method including at least a part of the above processing, or implemented as an image processing program that causes the image processing apparatus to execute the method. The above processing and means can be freely combined unless technical contradiction arises.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-114737, filed on May 18, 2012, which is hereby incorporated by reference herein in its entirety.

What is claimed is:

1. An image processing apparatus that blurs a picked-up image based on distance information on a subject, comprising:
   a restoration kernel acquisition section that acquires a restoration kernel as a kernel for eliminating degradation of an image, wherein the restoration kernel acquisition section acquires the restoration kernel associated with a distance and an angle of view corresponding to an area to be processed on the picked-up image;
   a blur kernel acquisition section that acquires a blur kernel as a kernel for blurring the image;
   a compound kernel acquisition section that acquires a compound kernel obtained by merging the restoration kernel with the blur kernel; and
   an image processing section that eliminates the degradation of the picked-up image and blurs the picked-up image by using the compound kernel.

2. The image processing apparatus according to claim 1, wherein the blur kernel acquisition section acquires the blur kernel associated with either of the distance or the angle of view corresponding to the area to be processed on the picked-up image.

3. The image processing apparatus according to claim 1, wherein the image processing section assigns the compound kernel to the area to be processed on the picked-up image, and performs blurring processing including image restoration by using the assigned compound kernel.

4. The image processing apparatus according to claim 3, further comprising:
   an image area extension section that determines an extended area as an area including at least one area to be processed, wherein
   the image area extension section determines a similarity of the compound kernel assigned to each area to be processed to merge, into one extended area, the areas to be processed corresponding to a plurality of the compound kernels that are determined to be similar to each other, and
   the image processing section performs the blurring processing including the image restoration on the extended area by using an identical compound kernel.

5. The image processing apparatus according to claim 4, wherein the image area extension section determines the similarity based on a size or a shape of the compound kernel assigned to the area to be processed.

6. The image processing apparatus according to claim 4, wherein the image area extension section determines the similarity based on a spatial frequency characteristic of the compound kernel assigned to the area to be processed.

7. The image processing apparatus according to claim 6, wherein the image area extension section determines the similarity further based on a visual spatial frequency characteristic.

8. The image processing apparatus according to claim 7, wherein the image area extension section determines the similarity based on a ratio between an integrated value of a product of the visual spatial frequency characteristic and the spatial frequency characteristic of the compound kernel assigned to the area to be processed, and an integrated value of the visual spatial frequency.

9. An image processing apparatus that blurs a picked-up image based on distance information on a subject, comprising:
   a restoration kernel acquisition section that acquires a restoration kernel as a kernel for eliminating degradation of an image;

a blur kernel acquisition section that acquires a blur kernel as a kernel for blurring the image; and an image processing section that eliminates the degradation of the picked-up image and blurs the picked-up image by using the restoration kernel and the blur kernel, wherein the restoration kernel acquisition section acquires the restoration kernel associated with a distance and an angle of view corresponding to an area to be processed on the picked-up image, and the blur kernel acquisition section acquires the blur kernel associated with the distance and the angle of view corresponding to the area to be processed on the picked-up image.

10. An image pickup apparatus comprising:
image pickup unit; and
the image processing apparatus according to claim 1.

11. A non-transitory recording medium recording thereon an image processing program for causing an image processing apparatus that blurs a picked-up image based on distance information on a subject to execute the steps of:

acquiring a restoration kernel as a kernel for eliminating degradation of an image, wherein the acquired the restoration kernel is associated with a distance and an angle of view corresponding to an area to be processed on the picked-up image;

acquiring a blur kernel as a kernel for blurring the image;

acquiring a compound kernel obtained by merging the restoration kernel with the blur kernel; and eliminating the degradation of the picked-up image and blurring the picked-up image by using the compound kernel.

12. A non-transitory recording medium recording thereon an image processing program for causing an image processing apparatus that blurs a picked-up image based on distance information on a subject to execute the steps of:

acquiring a restoration kernel as a kernel for eliminating degradation of an image;

acquiring a blur kernel as a kernel for blurring the image; and eliminating the degradation of the picked-up image and blurring the picked-up image by using the restoration kernel and the blur kernel, wherein the restoration kernel associated with a distance and an angle of view corresponding to an area to be processed on the picked-up image is acquired in the step of acquiring a restoration kernel, and the blur kernel associated with the distance and the angle of view corresponding to the area to be processed on the picked-up image is acquired in the step of acquiring a blur kernel.

* * * * *